(12) United States Patent
Lee et al.

(10) Patent No.: US 9,635,642 B2
(45) Date of Patent: Apr. 25, 2017

(54) METHOD AND APPARATUS FOR TRANSMITTING/RECEIVING CSI-RS OPERATING IN MASSIVE MIMO SYSTEM FDD MODE

(71) Applicants: Samsung Electronics Co., Ltd., Gyeonggi-do (KR); Industry-Academic Cooperation Foundation, Korea National University of Transportation, Chungju-si, Chungcheongbuk-do (KR)

(72) Inventors: Hyojin Lee, Seoul (KR); Cheol Mun, Chungcheongbuk-do (KR); Kiil Kim, Gyeonggi-do (KR); Younsun Kim, Gyeonggi-do (KR); Juho Lee, Gyeonggi-do (KR); Joonyoung Cho, Gyeonggi-do (KR)

(73) Assignees: Samsung Electronics Co., Ltd (KR); Industry-Academic Cooperation Foundation, Korean National University of Transportation (KR)

( * ) Notice: Subject to any disclaimer, the term of this patent is extended or adjusted under 35 U.S.C. 154(b) by 292 days.

(21) Appl. No.: 13/728,450

(22) Filed: Dec. 27, 2012

(65) Prior Publication Data
US 2013/0163544 A1 Jun. 27, 2013

(30) Foreign Application Priority Data
Dec. 27, 2011 (KR) ........................ 10-2011-0143377

(51) Int. Cl.
*H04W 4/00* (2009.01)
*H04W 72/04* (2009.01)
(Continued)

(52) U.S. Cl.
CPC .......... *H04W 72/04* (2013.01); *H04B 7/0617* (2013.01); *H04B 7/0626* (2013.01);
(Continued)

(58) Field of Classification Search
CPC .. H04B 7/0421; H04B 7/0426; H04B 7/0482; H04B 7/046
(Continued)

(56) References Cited

U.S. PATENT DOCUMENTS

| 8,792,896 B2 * | 7/2014 | Ahmad | H04B 7/022 370/331 |
| 8,989,114 B2 * | 3/2015 | Kim | H04W 76/046 370/252 |

(Continued)

FOREIGN PATENT DOCUMENTS

| CA | 2 780 755 | 11/2007 |
| WO | WO 2011/013990 | 2/2011 |

(Continued)

OTHER PUBLICATIONS

European Search Report dated Sep. 11, 2015 issued in counterpart application No. 12861196.9-1852, 8 pages.

*Primary Examiner* — Guang Li
(74) *Attorney, Agent, or Firm* — The Farrell Law Firm, P.C.

(57) ABSTRACT

Methods and apparatus are provided for beamforming and information feedback are provided. Signals for beams to be transmitted through corresponding antenna ports, are generated. The beams are formed by precoding the signals with beamforming vectors. The beams are sorted into a number of resource reuse groups based on a resource that is to be shared. The beams are transmitted, using resources allocated per group, to a receiver. Feedback information is generated on at least one antenna port, based on the received beams. The feedback information is transmitted to the transmitter. A beam is selected having a greatest gain for a transmitter using the feedback information. A transmission resource is allocated for the selected beam.

16 Claims, 12 Drawing Sheets

(51) Int. Cl.
*H04L 5/00* (2006.01)
*H04L 5/14* (2006.01)
*H04B 7/06* (2006.01)
*H04L 1/00* (2006.01)
*H04L 1/06* (2006.01)

(52) U.S. Cl.
CPC ......... *H04B 7/0695* (2013.01); *H04L 1/0003* (2013.01); *H04L 1/0009* (2013.01); *H04L 1/0026* (2013.01); *H04L 1/06* (2013.01); *H04L 5/0023* (2013.01); *H04L 5/0048* (2013.01); *H04L 5/143* (2013.01); *H04L 5/0091* (2013.01)

(58) Field of Classification Search
USPC .......................................................... 370/329
See application file for complete search history.

(56) References Cited

U.S. PATENT DOCUMENTS

| | | | |
|---|---|---|---|
| 2007/0042720 A1* | 2/2007 | Pan et al. .......................... 455/69 |
| 2008/0125136 A1* | 5/2008 | Song et al. ................. 455/452.1 |
| 2010/0033374 A1* | 2/2010 | van Rensburg et al. ..... 342/368 |
| 2010/0103900 A1* | 4/2010 | Yeh .................. H04B 7/0695 370/330 |
| 2010/0215110 A1 | 8/2010 | Onggosanusi et al. |
| 2010/0238984 A1 | 9/2010 | Sayana et al. |
| 2010/0246527 A1* | 9/2010 | Montojo ............ H04L 25/0226 370/330 |
| 2010/0284359 A1* | 11/2010 | Kim ...................... H04B 7/024 370/329 |
| 2011/0053628 A1* | 3/2011 | Kim et al. ..................... 455/509 |
| 2011/0176581 A1* | 7/2011 | Thomas ............... H04B 1/7075 375/146 |
| 2011/0194551 A1 | 8/2011 | Lee et al. |
| 2011/0205930 A1* | 8/2011 | Rahman et al. ............. 370/252 |
| 2011/0216840 A1* | 9/2011 | Lee et al. ...................... 375/259 |
| 2011/0243080 A1* | 10/2011 | Chen et al. .................... 370/329 |
| 2011/0249637 A1* | 10/2011 | Hammarwall et al. ....... 370/329 |
| 2011/0273977 A1* | 11/2011 | Shapira et al. ............... 370/208 |
| 2011/0305263 A1* | 12/2011 | Jongren et al. ............... 375/219 |
| 2012/0027111 A1* | 2/2012 | Vook et al. .................... 375/267 |
| 2012/0082052 A1* | 4/2012 | Oteri et al. ................... 370/252 |
| 2012/0155414 A1* | 6/2012 | Noh et al. ..................... 370/329 |
| 2012/0170677 A1* | 7/2012 | Venturino et al. ........... 375/267 |
| 2012/0230274 A1* | 9/2012 | Xiao et al. .................... 370/329 |
| 2012/0281554 A1* | 11/2012 | Gao ...................... H04W 48/12 370/252 |
| 2012/0282936 A1* | 11/2012 | Gao ...................... H04L 5/0023 455/450 |
| 2012/0287875 A1* | 11/2012 | Kim et al. ..................... 370/329 |
| 2012/0315938 A1* | 12/2012 | Van Nee ............... H04B 7/0434 455/507 |
| 2013/0017855 A1* | 1/2013 | Hui et al. ...................... 455/522 |
| 2013/0039349 A1* | 2/2013 | Ebrahimi Tazeh Mahalleh et al. .............................. 370/336 |
| 2013/0051321 A1* | 2/2013 | Barbieri ............... H04B 7/0626 370/328 |
| 2013/0064129 A1* | 3/2013 | Koivisto et al. ............. 370/252 |
| 2013/0089040 A1* | 4/2013 | Tabet .................... H04L 5/0073 370/329 |
| 2013/0128860 A1* | 5/2013 | Zhang .................. H04L 5/0053 370/330 |
| 2013/0171998 A1* | 7/2013 | Liu et al. ...................... 455/446 |

FOREIGN PATENT DOCUMENTS

WO    WO 2011/093671      8/2011
WO    WO 2011153264 A2 * 12/2011 ........... H04L 5/0053

\* cited by examiner

METHOD AND APPARATUS FOR TRANSMITTING/RECEIVING CSI-RS OPERATING IN MASSIVE MIMO SYSTEM FDD MODE

PRIORITY

This application claims priority under 35 U.S.C. 119(a) to an application filed in the Korean Intellectual Property Office on Dec. 27, 2011, and assigned Serial No. 10-2011-0143377, the contents of which are incorporated herein by reference.

BACKGROUND OF THE INVENTION

1. Field of the Invention

The present invention relates generally to a massive Multiple-Input Multiple-Output (MIMO) system operating in a Frequency Division Duplex (FDD) mode and, more particularly, to a method and apparatus for efficiently transmitting/receiving a Channel State Information Reference Signal (CSI-RS) with a limited amount of downlink resource in the massive MIMO wireless communication system.

2. Description of the Related Art

In the massive MIMO technique, a base station equipped with a specified number, such as, for example, a few hundred, transmit antennas transmits data to a plurality of mobile stations with a multi-user MIMO scheme. Since the transmit beamforming gain is in proportion to the number of transmit antennas and it is possible to reduce the transmit power of each antenna with the high beamforming gain expected with the massive MIMO system, the massive MIMO has emerged as an important "green" communication technology.

In order to form the transmit beams of the massive MIMO system, the transmitter must receive downlink Channel State Information (CSI) for each downlink. In a Time Division Duplexing (TDD) system, a downlink channel estimation technique has been proposed that is based on a Sounding Reference Signal (SRS). However, in this technique, an uplink SRS's vulnerability to inter-cell interference degrades the channel estimation performance, resulting in reduction of system throughput.

In the traditional FDD Long Term Evolution-Advanced (LTE-A) system, the CSI-RS symbols are mapped to the Resource Elements (REs) on different carriers in a frequency domain, and at different Orthogonal Frequency Division Multiplexing (OFDM) symbols in a time domain, or are multiplied by orthogonal codes to maintain orthogonality between transmit antenna ports at every downlink slot. If this scheme is applied to the massive MIMO system without modification, the number of CSI-RSs required is equal to the number of transmit antennas, and thus, a few hundred REs are allocated for CSI-RS transmission. This causes a reduction in the number of REs for data transmission, resulting in a reduction in downlink transmission capacity. Furthermore, the CSI-RS transmission at low power level per transmit antenna significantly decreases the CSI-RS reception performance.

SUMMARY OF THE INVENTION

The present invention has been made to address at least the above problems and/or disadvantages and to provide at least the advantages described below. Accordingly, an aspect of the present invention provides a data transmission/reception apparatus and method that is capable of transmitting channel information for multiple antennas using a limited amount of downlink resources, especially in a massive MIMO system equipped with multiple transmit antennas, and efficiently estimating the downlink CSI at the receiver.

Another aspect of the present invention provides a data transmission/reception method with a spatial multiplexing technique that allows multiple beams to reuse a CSI-RS resource that is capable of allocating the same resource to beams for which intra-channel interference can be suppressed by high special interference suppression performance of a massive MIMO system.

An additional aspect of the present invention provides a data transmission/reception method with a maximum gain beamforming weight determination technique that is capable of determining, at the base station transmitter, a beam with the greatest gain in such a way that the base station transmitter combines average channel gain of CSI-RSs estimated with uplink spatial correlation matrix and resource reuse group index information fed back by the mobile station receiver.

A further aspect of the present invention provides a data transmission/reception method with a downlink Radio Resource Control (RRC) signaling technique that is capable of improving the system throughput in such a way that the base station notifies each mobile station receiver of a number of beams reusing each resource element, each CSI-RS resource, or power allocated for each beam through downlink RRC signaling in order for the mobile station receiver to estimate Channel Quality Information (CQI).

Embodiments of the present invention provide a method for efficiently transmitting CSI-RS using a limited downlink resource amount in the massive MIMO system operating in FDD mode.

In accordance with an aspect of the present invention, a beamforming method of a transmitter using a plurality of antenna ports in a wireless communication system is provided. Signals for beams to be transmitted through corresponding antenna ports, are generated. The beams are formed by precoding the signals with beamforming vectors. The beams are sorted into a number of resource reuse groups based on a resource that is to be shared. The beams are transmitted, using resources allocated per group, to a receiver. A beam is selected having a greatest gain for a transmitter using feedback information on at least one of the antenna ports, which is transmitted by the receiver. A transmission resource is allocated for the selected beam.

In accordance with another aspect of the present invention, an information feedback method is provided in a wireless communication system. Beams sorted into a number of resource reuse groups through resources allocated for respective resource reuse groups, are received from a transmitter. Feedback information is generated on at least one antenna port, based on the received beams, for use in determining a beam having a greatest gain at the transmitter. The feedback information is transmitted to the transmitter. The beams are formed by precoding per-beam signals to be transmitted through respective antenna ports of the transmitter with respective beamforming vectors.

In accordance with an additional aspect of the present invention, a transmitter equipped with a plurality of antenna ports for beamforming in a wireless communication system is provided. The transmitter includes a radio communication unit that communicates signals with a receiver. The transmitter also includes a control unit that controls generation of signals for beams to be transmitted through corresponding antenna ports, formation of the beams by precoding the signals with beamforming vectors, sorting of the beams into a number of resource reuse groups based on a resource that is to be shared, transmission of the beams, using resources allocated per group, to a receiver, selection of a beam having a greatest gain for the transmitter using feedback information on at least one of the antenna ports, which is transmitted by the receiver, and allocation of a transmission resource for the selected beam.

In accordance with a further aspect of the present invention, a receiver is provided for transmitting feedback information to a transmitter in a wireless communication system. The receiver includes a radio communication unit, which communicates signals with the transmitter. The receiver also includes a control unit which controls reception of beams sorted into a number of resource reuse groups through resources allocated for respective resource reuse groups, from a transmitter, generation of feedback information on at least one antenna port, based on the received beams, for use in determining a beam having a greatest gain at the transmitter, and transmission of the feedback information to the transmitter, wherein the beams are formed by precoding per-beam signals to be transmitted through respective antenna ports of the transmitter with respective beamforming vectors.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
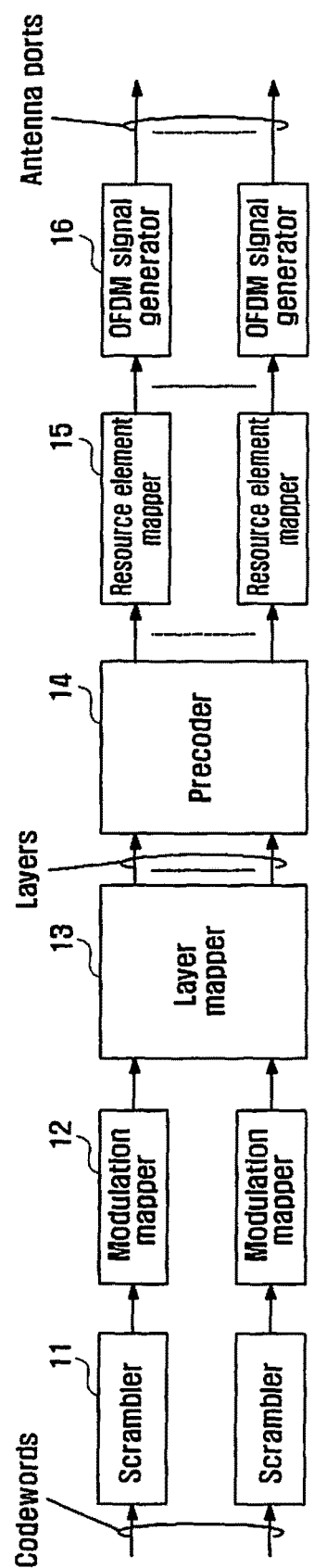
FIG. 1 is a diagram illustrating the physical channel processing operation for signal transmission in the transmitter of an LTE-A system, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In an LTE-A system, the CSI-RSs for 8 transmit antennas are mapped to a Physical Downlink Shared Channel (PDSCH) so as to be transmitted at a period greater than or equal to 5 ms. The CSI-RSs for 8 antenna ports are multiplexed in the frequency domain according to an FDM scheme, or in both the frequency and time domains according to FDM and TDM schemes. The CSI-RSs can also be multiplexed in the code domain according to a CDM scheme, as well as the FDM and TDM schemes.

FIG. 1 is a diagram illustrating a physical channel processing operation for signal transmission in the transmitter of an LTE-A system, according to an embodiment of the present invention. Codewords are input to respective scramblers 11. The scramblers 11 generate scrambled information to respective modulation mappers 12, and the modulation mappers 12 modulate the scrambled information. Modulation symbols from the modulation mappers 12 are input to the layer mapper 13, and the layer mapper 13 generates layer symbols to the precoder 14. The precoder 14 performs precoding on the layer symbols to generate precoded symbols to resource element mappers 15 for respective antenna ports. The resource element mappers 15 map the symbols to the resource grid defined per antenna port, as shown in FIG. 2 The mapped symbols are sent to the per-antenna port OFDM signal generators 16, which generate OFDM signals to be transmitted through respective antenna ports.

Figure 2:
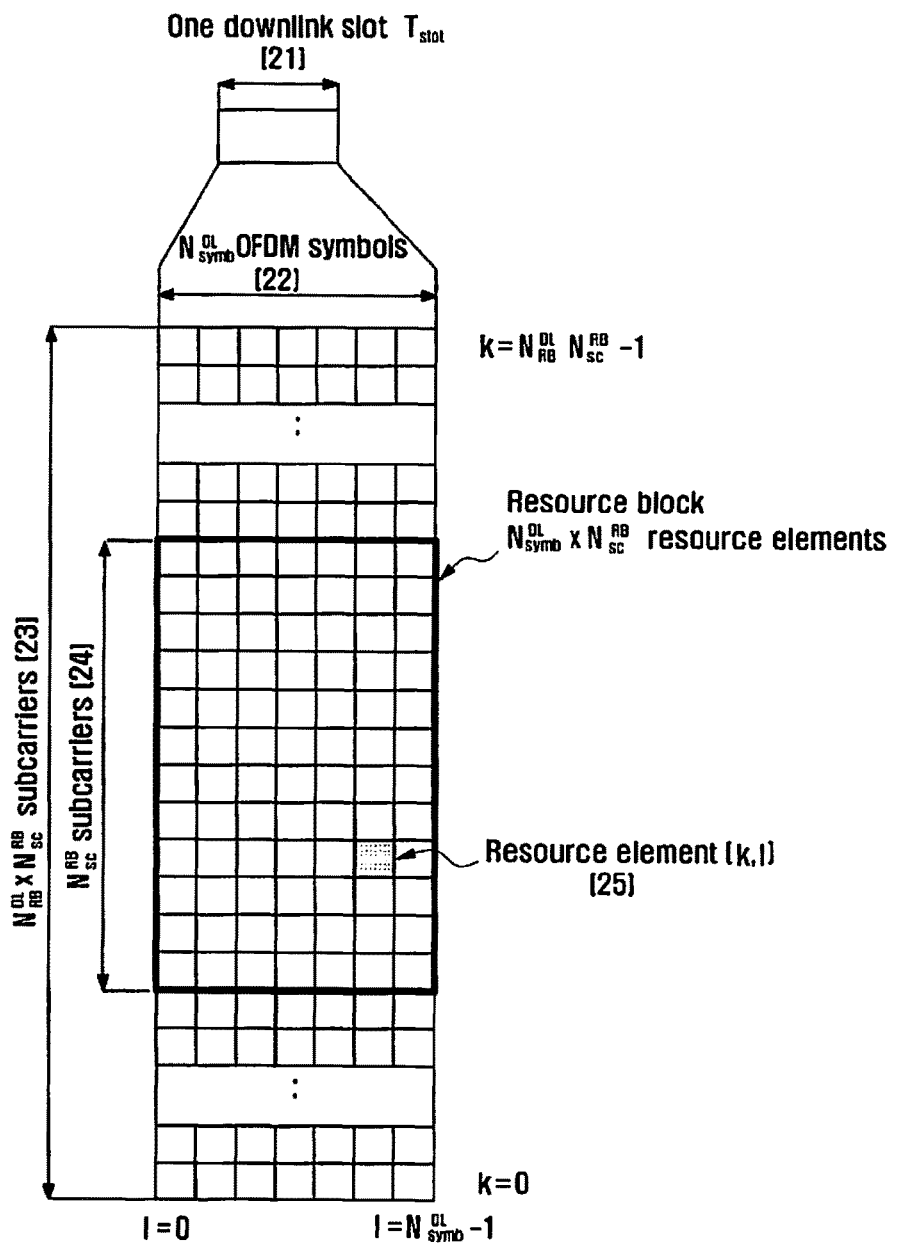
FIG. 2 is a diagram illustrating the resource grid defined per antenna port, according to an embodiment of the present invention.

FIG. 2 is a diagram illustrating a resource grid defined per antenna port, according to an embodiment of the present invention. The downlink transmission signals are mapped to the resource grid defined by $N_{RB}^{DL} \times N_{SC}^{RB}$ subcarriers 23 in the frequency domain and $N_{sym}^{DL}$, OFDM symbols 22 in the time domain within a downlink slot $T_{slot}$ 21. The resource grid of one slot is divided into $N_{RB}^{DL}$ Resource Blocks (RBs), and each RB consists of $N_{SC}^{RB}$ subcarriers 24 in the frequency domain and $N_{symbol}^{DL}$ OFDM symbols 22 in the time domain. In the resource grid defined per antenna port, a Resource Element (RE) 25 is uniquely identified by an index pair (k, l) in each slot. Here, k=o, ...., $N_{RB}^{DL} \times N_{SC}^{RB}-1$ and l=0, ...., $N_{symbol}^{DL}-1$ denotes frequency and time domain indices, respectively.

The number of CSI-RSs is always equal to the number of antenna ports regardless of the number of codewords or layers. In order to guarantee orthogonality among CSI-RSs for different antenna ports, the resource allocated for an antenna port, for CSI-RS transmission at each slot, is not used by other antenna ports. Accordingly, if the number of CSI-RSs to be transmitted increases in proportion to the number of transmit antennas of the transmitter, more resource must be allocated for CSI-RS transmission in a slot. As a consequence, the number of resources to be allocated for data transmission decreases, resulting in a reduction of downlink transmission capacity.

In the massive MIMO system, the base station transmits data to multiple mobile stations simultaneously, using Space Division Multiple Access (SDMA), to perform beamforming for multiple mobile stations with an antenna array composed of a few hundreds transmit antennas operating at a low transmit power. The following description is directed to a massive MIMO system operating in an FDD mode with M transmit antennas.

In the massive MIMO system operating in the FDD mode, according to an embodiment of the present invention, a method is provided for transmitting the channel information through multiple transmit antennas using a limited amount of CSI-RS resources and efficiently receiving the channel information. The method operates in such a way that the base station performs beamforming to transmit, to the mobile station, the N per-beam signals using N beamforming vectors of size M, so as to significantly increase the reception performance for a specific beam even with a low transmit power per transmit antenna. The mobile station is capable of estimating the channel information from the multiple transmit antennas. Embodiments of the present invention also provide a method for reusing a resource for multiple beams in such a way that the base station allocates the same resource for the beams capable of suppressing interference with the high beamforming gain of the massive MIMO system. Specifically, the data transmission method, according to an embodiment of the present invention, is capable of transmitting channel information for multiple transmit antennas with the application of SDM as well as CDM, FDM, and TDM, in code, frequency, and time domains. Through additional multiplexing in the space domain, according to the SDM scheme, the resource multiplexed in code, frequency, and time domains is reused to transmit the channel information for multiple transmit antennas with a small amount of CSI-RS resources, which is not in proportion to the number of transmit antennas.

Figure 3:
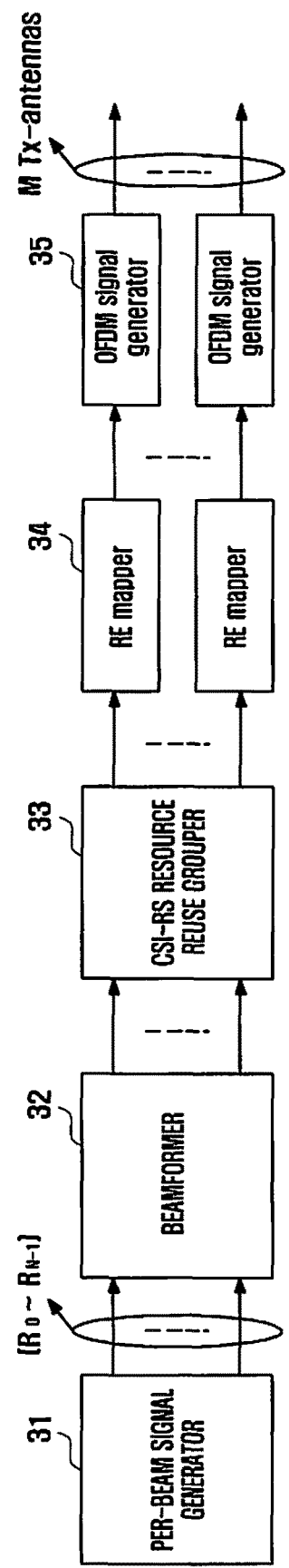
FIG. 3 is a block diagram illustrating the physical channel processing operation for CSI-RS transmission in the CSI-RS transmission method, according to an embodiment of the present invention.

FIG. 3 is a block diagram illustrating a physical channel processing operation for CSI-RS transmission in the CSI-RS transmission method, according to an embodiment of the present invention. In this embodiment of the present invention, the description is directed to the case of using the column vectors of an N×N Discrete Fourier Transform (DFT) matrix as N beamforming vectors for N transmit antennas.

A per-beam signal generator 31 of FIG. 3 generates N per-beam signals $\{R_n\}_{n=0, \ldots, N-1}$ to be transmitted for the antenna ports. The per-beam signals are random sequences generated by the transmitter that are known to both or any of the transmitter and receiver. According to an embodiment of the present invention, the size of the per-beam signal may be set to 1.

A beamformer 32 of FIG. 3 performs precoding on the N per-beam signals $\{R_n\}_{n=0, \ldots, N-1}$ with beamforming vector $\{u_n\}_{n=0, \ldots, N-1}$ as N column vectors of size N×1 constituting N×N DFT matrix U. It is assumed that the $n^{th}$ per-beam signal $R_n$ is precoded with the nth column vector $U_n$. The per-beam signals are precoded with the beamforming vectors to generate beams to be transmitted through the respective antenna ports.

$$R_n u_n = \begin{bmatrix} R_n u_{n,1} \\ R_n u_{n,2} \\ \vdots \\ R_n u_{n,N} \end{bmatrix} = \begin{bmatrix} r_{n,1} \\ r_{n,2} \\ \vdots \\ r_{n,N} \end{bmatrix} \quad (1)$$

In Equation (1), $u_n = [u_{n,1} \ u_{n,2} \ \ldots \ u_{n,N}]^T$ and thus, the $R_n$ is precoded to an N×1 vector $[r_{n,1} \ r_{n,2} \ \ldots \ r_{n,N}]^T$. By transmitting the per-beam signals through beamforming, it is possible to expect very high reception performance for some beams with the high beamforming gain of the massive MIMO system.

A CSI-RS resource reuse grouper 33 of FIG. 3 sorts the beams to share a CSI-RS resource into G resource reuse groups. Since it guarantees a very high beamforming gain, the massive MIMO has a high directivity characteristic with which the signal is oriented to a highly restricted direction. Accordingly, although the beams, which are distant from each other spatially, are allocated the same resource, the intra-channel interference among the signals sharing the same resource is spatially filtered by the high directivity characteristic of the beams so as to be efficiently suppressed. Through this resource reuse scheme, it is possible to dramatically reduce the number of resources multiplexed in code, frequency, and time domains for channel information transmission associated with N transmit antennas, without performance degradation. In order for the mobile station to accurately estimate the channel feedback values, it is necessary for the base station to signal a value G, indicating a CSI-RS resource reuse level, to the mobile station. If the mobile station knows the resource reuse level, it is capable of more precisely checking the state of the data channel to which no resource reuse is applied, and thus, more precisely feeding back the data modulation and coding level calculated.

In a massive MIMO system using 128 transmit antennas and 128 beams, if 16 beams reuse one resource, total 8 resource reuse groups $\{\mathcal{R}_y\}_{y=0, \ldots, 7}$ are required. The channel information for 128 transmit antennas are transmitted with only 8 resources, and the resource reuse group $R_g$ using the $g^{th}$ resource can be expressed by Equation (2) below.

$$\begin{aligned}
\mathcal{R}_0 &= \{ R_0, \ R_8, \ \ldots \ R_{120} \} \\
\mathcal{R}_1 &= \{ R_1, \ R_9, \ \ldots \ R_{121} \} \\
&\vdots \\
\mathcal{R}_6 &= \{ R_6, \ R_{14}, \ \ldots \ R_{126} \} \\
\mathcal{R}_7 &= \{ \underbrace{R_7, \ R_{15}, \ \ldots \ R_{127}}_{16 \ OSI-RS_3} \}
\end{aligned} \quad (2)$$

The 16 per-beam signals belonging to each resource reuse group are spatially multiplexed by the 16 beams to be transmitted.

Figure 4:
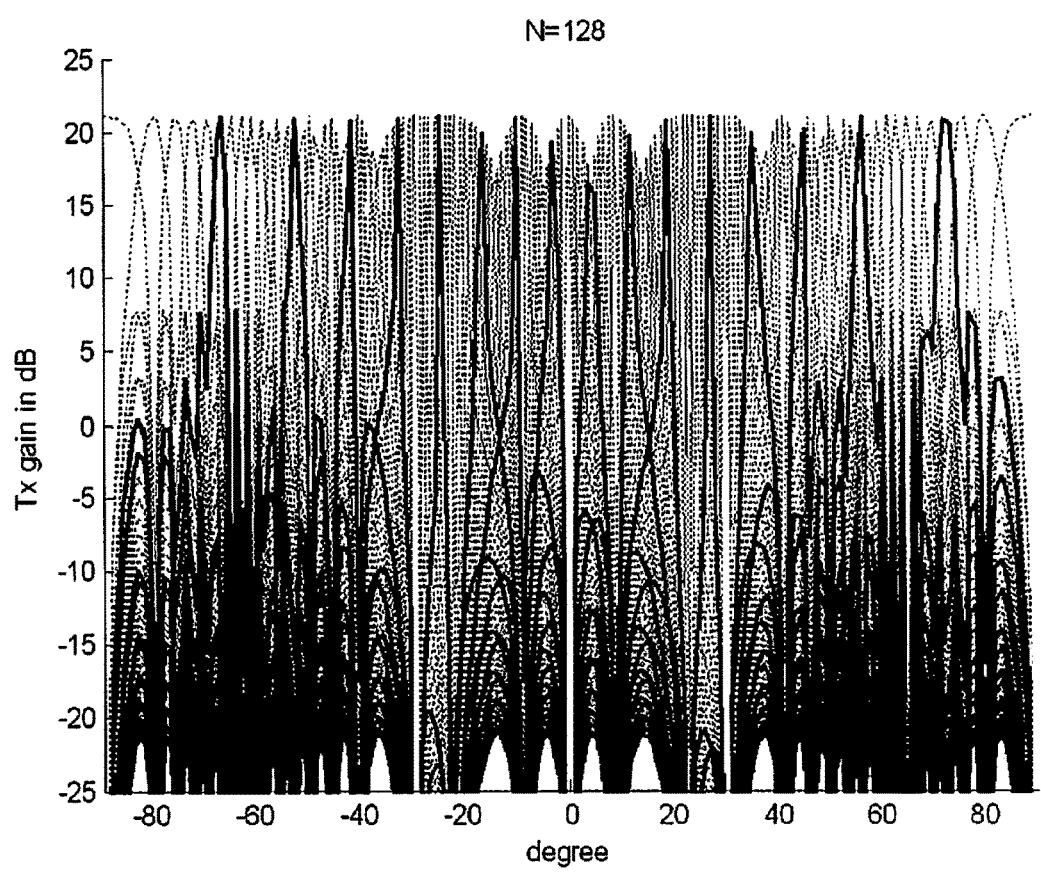
FIG. 4 is a graph illustrating a beamforming CSI-RS transmission and resource element reuse in the CSI-RS transmission method, according to an embodiment of the present invention.

FIG. 4 shows a beam pattern of 16 beams used in transmission of 16 per-beam sequences $\{R_3, R_{11}, \ldots R_{123}\}$ belonging to the resource reuse group $R_s$ sharing the $3^{rd}$ resource, according to an embodiment of the present invention. The 16 beams have azimuth directions discrete at a predetermined angle to maintain the intra-channel interference among the 16 beams below a predetermined level. The algorithm for determining beams sharing the same resource is selected in the course of minimizing the maximum interference among the beams allocated the same resource.

Figure 5:
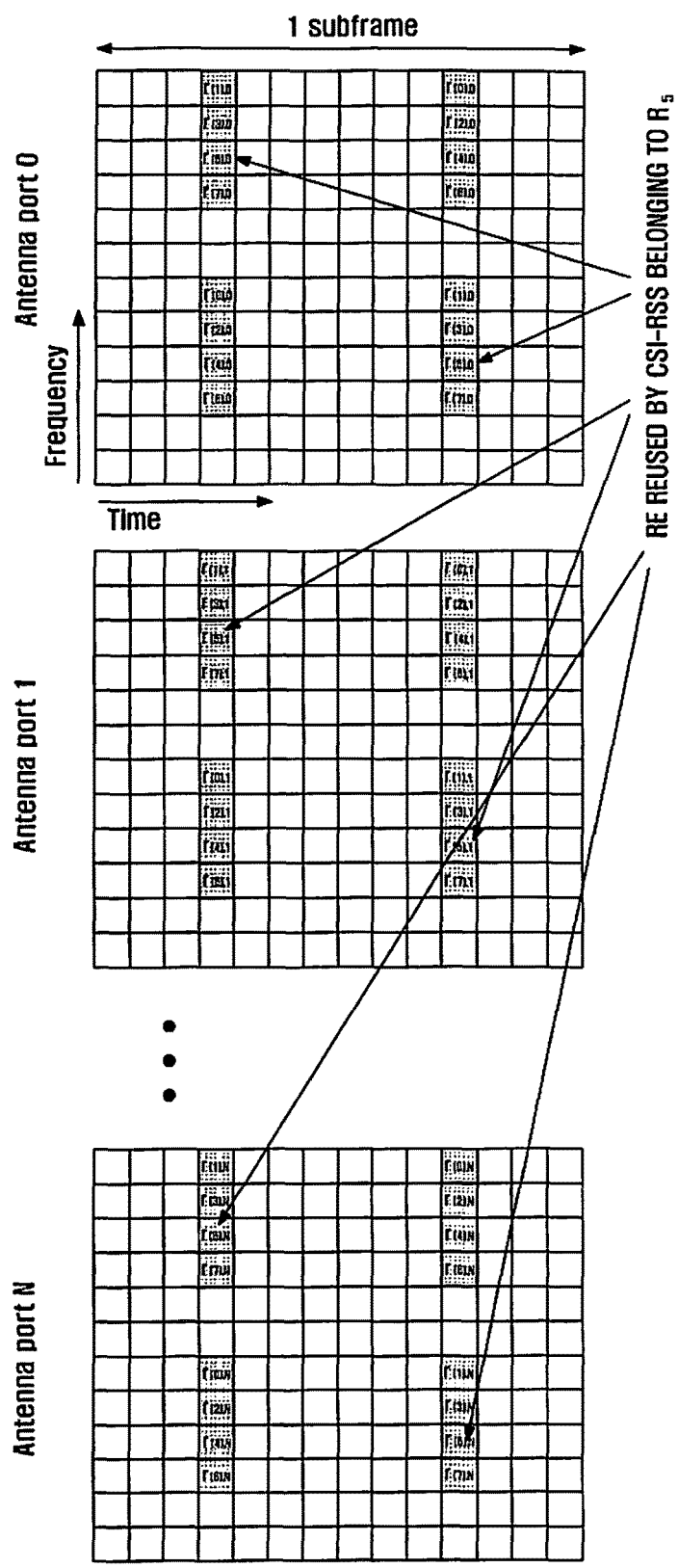
FIG. 5 is a diagram illustrating per-antenna port resource grids for CSI-RS resource allocation in a Physical Resource Block (PRB) when transmitting 128 beams with 8 resources per slot, according to an embodiment of the present invention.
Figure 6:
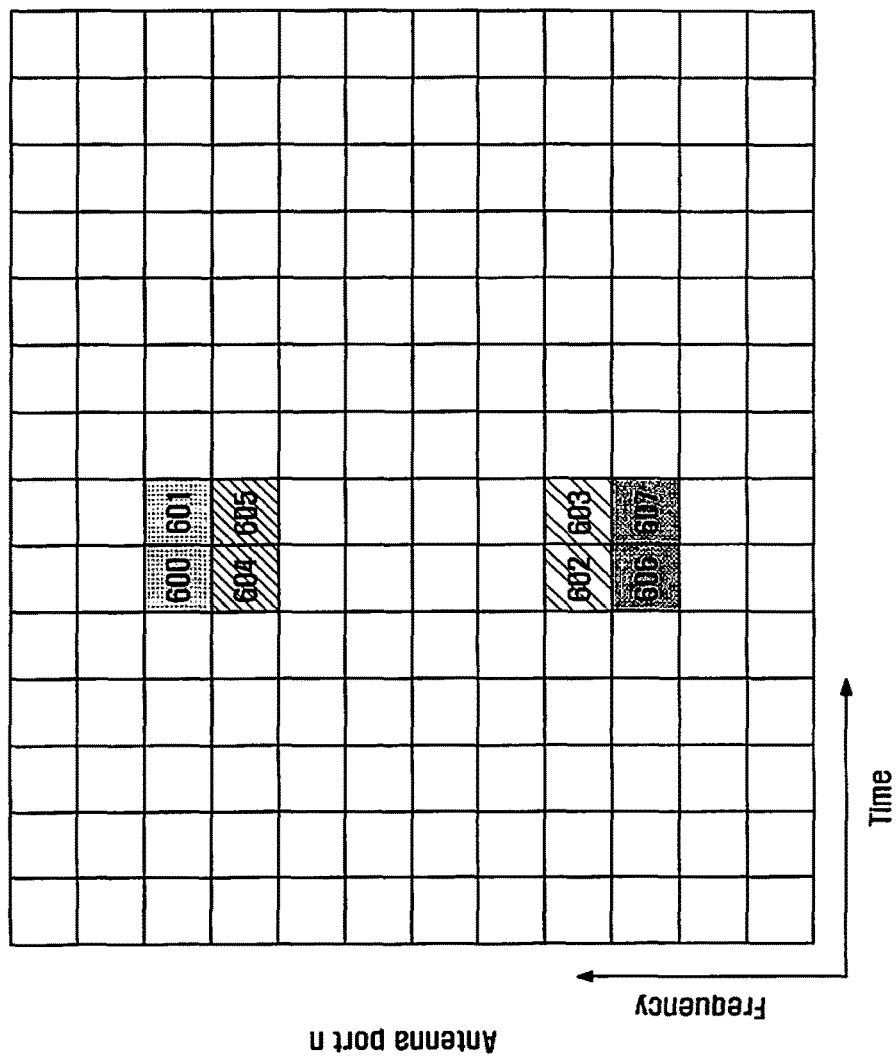
FIG. 6 is a diagram illustrating a configuration of the subframe for allocating 8 CSI-RS resources for 128 beams as described with reference to FIG. 5 when 8 CSI-RS resources are allocated through Code Division Multiplexing (CDM), Frequency Division Multiplexing (FDM), and Time Division Multiplexing (TDM) schemes, according to an embodiment of the present invention.

Referring back to FIG. 3, RE mappers 34 allocate the resource for the reuse group designated by the CSI-RS resource reuse grouper 33. FIG. 5 is a diagram illustrating per-antenna port resource grids for CSI-RS resource allocation in a PRB in the case of transmitting 128 beams with 8 resources per slot, according to an embodiment of the present invention. A subframe consists of two slots, and it is assumed that the CSI-RS is transmitted with 8 resources at every slot. In FIG. 5, $r_{\{g\},n}$ denotes the symbol mapped to the resource grid of nth transmit antenna among N symbols $\{r_{n,m}\}_{m=0,\ldots,N-1}$ generated by multiplying the weight $u_n$ to the 16 signals $\{R_n\}_{n=g,g+8,\ldots,N-8+g}$ belonging to the reuse group $R_g$ as shown in Equation (1). In FIG. 5, the resource indicated by the arrows in the resource grid of each transmit antenna denotes the resources on which 16 per-beam sequences $\{R_5, R_{13}, \ldots R_{125}\}$ belonging to $R_5$ are spatially multiplexed by 16 beams. FIG. 6 is a diagram illustrating a configuration of the subframe for allocating 8 CSI-RS resource for 128 beams as described with reference to FIG. 5 in the case where 8 CSI-RS resources are allocated through CDM, FDM, and TDM schemes, according to an embodiment of the present invention. $r_{\{g\},n}$ denotes the symbol as defined with reference to FIG. 5, and the two CSI-RS resources, consecutive in the time domain, are discriminated through CDM using [1, 1] and [1, −1].

Referring again to FIG. 3, OFDM signal generators 35 generate OFDM signals and transmit the signals through corresponding antenna ports.

The receiver of each mobile station estimates the channel condition by referencing the corresponding CSI-RS resource.

Equation (3) expresses the signal $y_{k,g}$ received by the $k^{th}$ mobile station with reference to CSI-RS resource bused by the reuse group $R_g$. Although the received signals are carried by the beams belonging to the reuse group $R_g$ that are transmitted on the same resource, the signals carried by the beams, which are very weak in channel gain with the downlink channel $h_k$ to the corresponding receiver due to the high directivity characteristic of the massive MIMO, are likely to be ignored. The signal $y_{k,g}$ can be approximated to the signal carried by the beam $u_n^*$ having the highest channel gain with $h_k$ expressed in the second line of equation (3)

$$y_{k,g} = \sum_{R_n \in R_g} R_n h_k u_n \approx R_n h_k u_n,$$ (3)

In the legacy LTE-A, each mobile station is capable of discriminating among the antenna ports according to the position in code, frequency, and time domains within a subframe. Embodiments of the present invention are characterized in that the mobile station compares the sizes of the CSI-RS resources, i.e., the sizes of the channel gains $\|h_k u_n\|$ between $h_k$ and beamforming weight $u_n$, among each other to determine the greatest resource and feeds back the index n* of the greatest resource to the base station. In embodiments of the present invention, multiple beams are simultaneously transmitted on a CSI-RS resource such that the index n* denotes the resource reuse group index other than the beam index. Accordingly, the base station transmitter has to select the beam having the greatest gain for the corresponding mobile station among the beams that are spatially multiplexed in the corresponding resource reuse group using the resource reuse group index information fed back by the mobile stations. In an embodiment of the present invention for transmitting 128 beams using 8 CSI-RS resources, 16 beams are multiplexed into each resource such that the base station has to determine the beam having the greatest gain among the 16 beams belonging to the resource reuse group indicated by the index fed back by each mobile station.

Embodiments of the present invention provide a method for determining the beam having the greatest gain by combining the average channel gain information on the N beams estimated with uplink spatial correlation matrix and the resource reuse group index information fed back instantaneously.

In an embodiment of the present invention, the base station estimates 1×N uplink instantaneous channel vector $t_k$ based on the uplink SRS transmitted by each mobile station. The uplink spatial correlation matrix $T_k$ using the vector as expressed by Equation (4) below.

$$T_k = E[t_k^T t_k]$$ (4)

Since even in the FDD system, which uses different frequency bands for uplink and downlink, the uplink and downlink spatial correlation matrices match, the uplink spatial matrix estimated by Equation (4) can be used to calculate the average channel gain of a downlink channel with the beamforming weights.

Accordingly, the base station is capable of calculating the average channel gain $\bar{g}_{k,n}$ of the downlink channel of the $n^{th}$ beam with the $n^{th}$ transmission beam weight $u_n$ using the uplink spatial correlation matrix estimated per link, as expressed by Equation (5) below.

$$\bar{g}_{k,n} = u_n^H T_k u_n$$ (5)

The base station estimates the average channel gain $\{\bar{g}_{k,n}\}_{0=1,\ldots,N-1}$ for N beams per downlink to each mobile station, and determines a long-term active beam set $A_k$ including the indices of the beams of which average channel gain is equal to or greater than a predetermined threshold value. The set $A_k$ varies according to the channel variation, and thus, the base station updates $A_k$ periodically or non-periodically.

The base station determines, among the beams belonging to the long-term active beam set $A_k$, one of the beams belonging to the resource reuse group indicated by the resource index fed back instantaneously from each mobile station, as the beam having the greatest gain for the corresponding mobile station. In a massive MIMO system using 128 transmit antennas, assuming that 16 beams are multiplexed and a total 8 of resource reuse groups $\{\mathcal{R}_g\}_{g=0,\ldots,7}$ are defined by Equation (2), if $\mathcal{A}_k = \{13,14,15,16\}$ and the resource index fed back instantaneously is 6, the beam index indicating the real beam having the greatest instantaneous gain is 14.

Although the above description is directed to the case where the mobile station compares the channel gains ($\|h_k u_n\|$) of $h_k$ and the beamforming weight $u_n$ to determine the index n* of the resource having the greatest channel gain and feeds back the determined resource index to the base station, embodiments of the present invention are not limited thereto. For example, the mobile station is capable of generating feedback information on at least one antenna port and transmitting the feedback information to the base station. In this case, the base station is capable of acquiring the channel information on all antenna ports between the base and mobile stations and using this information in the resource allocation procedure afterward.

The mobile station receiver estimates channel state, i.e. for the beamforming by referencing the CSI-RS resource and feeds back the CSI to the base station. The CSI includes at least one of the Signal-to-Interference and Noise Ratio (SINR) at the mobile station, an available downlink data rate from the base station to the mobile station, and a Modulation and Coding Scheme (MCS) available for transmission from the base station to the mobile station. In order to estimate CSI, the mobile station has to know the total number of beams used in transmission or the power amount allocated for each beam. In an embodiment of the present invention in which a resource is reused for multiple beams, the base station notifies all mobile stations of the information on the number of beams reusing each resource or the transmit power allocated for each beam through downlink RRC signaling.

Figure 7:
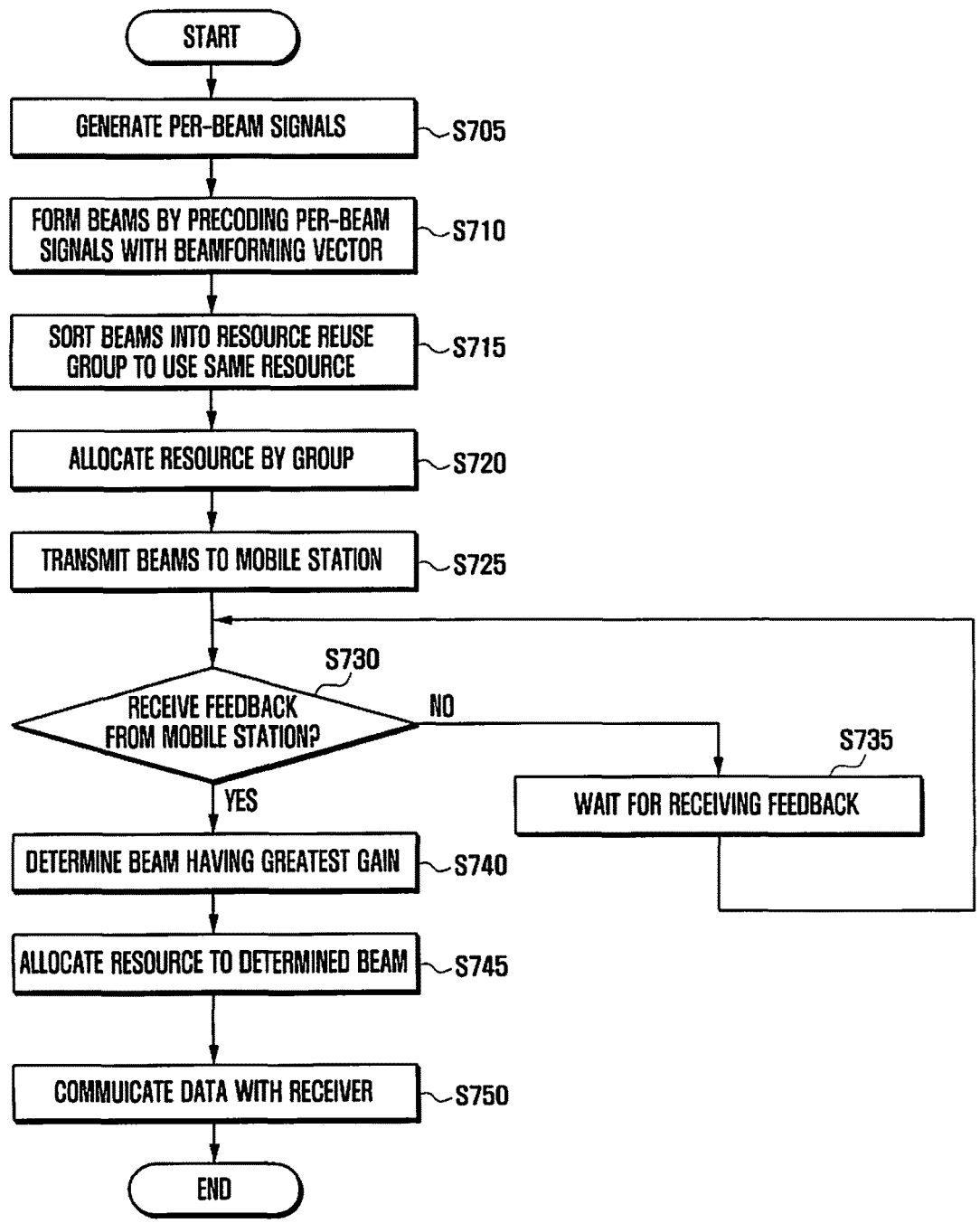
FIG. 7 is a flowchart illustrating an operating procedure of the transmitter in the CSI-RS transmission method, according to an embodiment of the present invention.

FIG. 7 is a flowchart illustrating the operating procedure of the transmitter in the CSI-RS transmission method, according to an embodiment of the present invention.

The transmitter first generates a signal per beam to be transmitted through each antenna port, in step S705. The transmitter forms a beam by precoding the per-beam signal using a beamforming vector, in step S710.

The transmitter sorts the beams into resource reuse groups, each consisting of beams sharing the same resource, in step S715. In an embodiment of the present invention, the beams are grouped so as to minimize interference among beams sharing the resource.

The transmitter allocates the resource for each group, in step S720. The transmitter transmits the beam to the corresponding receiver using the allocated resource, in step S725.

The transmitter determines whether feedback information is received from the receiver, in step S730. The feedback information includes the resource reuse group index and channel quality information. According to an embodiment of the present invention, the feedback information may refer to feedback information on at least one antenna port.

If no feedback information is received, the transmitter waits until the feedback information is received, in step S735.

If the feedback information is received, the transmitter selects the beam having the greatest gain in association with the receiver, in step S740.

In order to select a beam, the transmitter extracts the index of the resource reuse group, of which channel gain for the downlink channel and beamforming vector, from the feedback information. Simultaneously, the transmitter estimates an uplink spatial correlation matrix using the uplink SRS transmitted by the receiver, and calculates the average channel gain for the downlink channel using the estimated uplink spatial correlation matrix. The transmitter is capable of determining the beam having the greatest gain among the beams belonging to the resource reuse group using the resource reuse group index and the average channel gain for the downlink channel.

The transmitter allocates the resource for the determined beam, in step S745, and communicates data with the receiver, in step S750.

Figure 8:
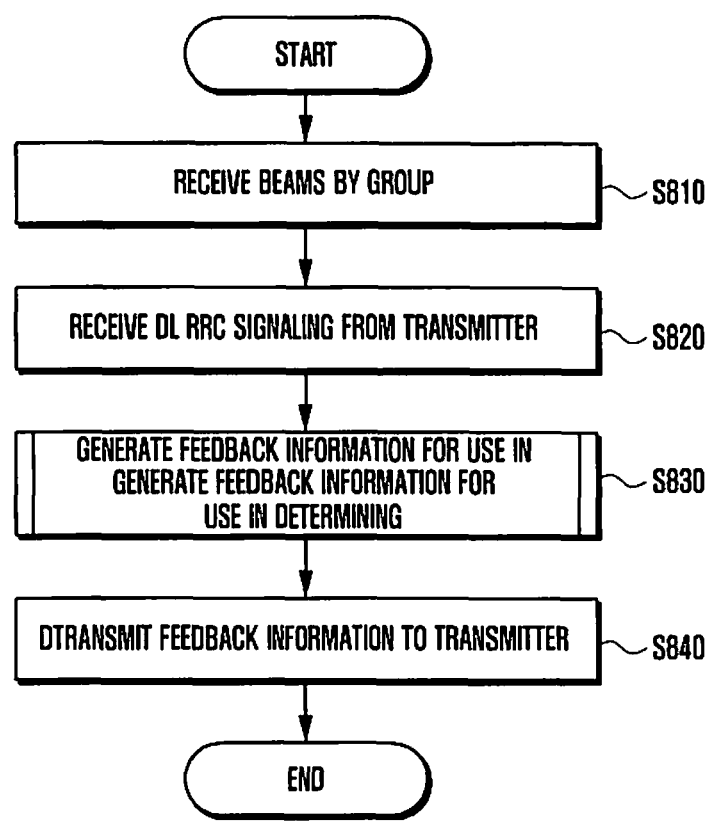
FIG. 8 is a flowchart illustrating an operating procedure of the receiver in the CSI-RS transmission method, according to an embodiment of the present invention.

FIG. 8 is a flowchart illustrating the operating procedure of the receiver in the CSI-RS transmission method, according to an embodiment of the present invention.

The receiver receives per-group beams transmitted by the transmitter, in step S810. The beams are formed by precoding the per-beam signals to be transmitted through the respective antenna ports with beamforming vectors. The beams are discriminated among a certain number of resource reuse groups and transmitted using the resources allocated for the respective resource reuse groups.

The receiver receives a downlink RRC signaling from the transmitter, in step S820. The downlink RRC signaling includes information on at least one of the number of beams reusing each resource element, each CSI-RS resource, and the transmit power of each beam.

Although steps S810 and S820 are performed independently in FIG. 8, the processing order is not limited to that depicted in FIG. 8.

The receiver generates the feedback information for transmitter use in determining the beam having the greatest gain, in step S830. Step S830 is described in greater detail below with reference to FIG. 9.

The receiver transmits the feedback information to the transmitter, in step S840. According to an embodiment of the present invention, the feedback information may be embodied as feedback information on at least one antenna port.

Figure 9:
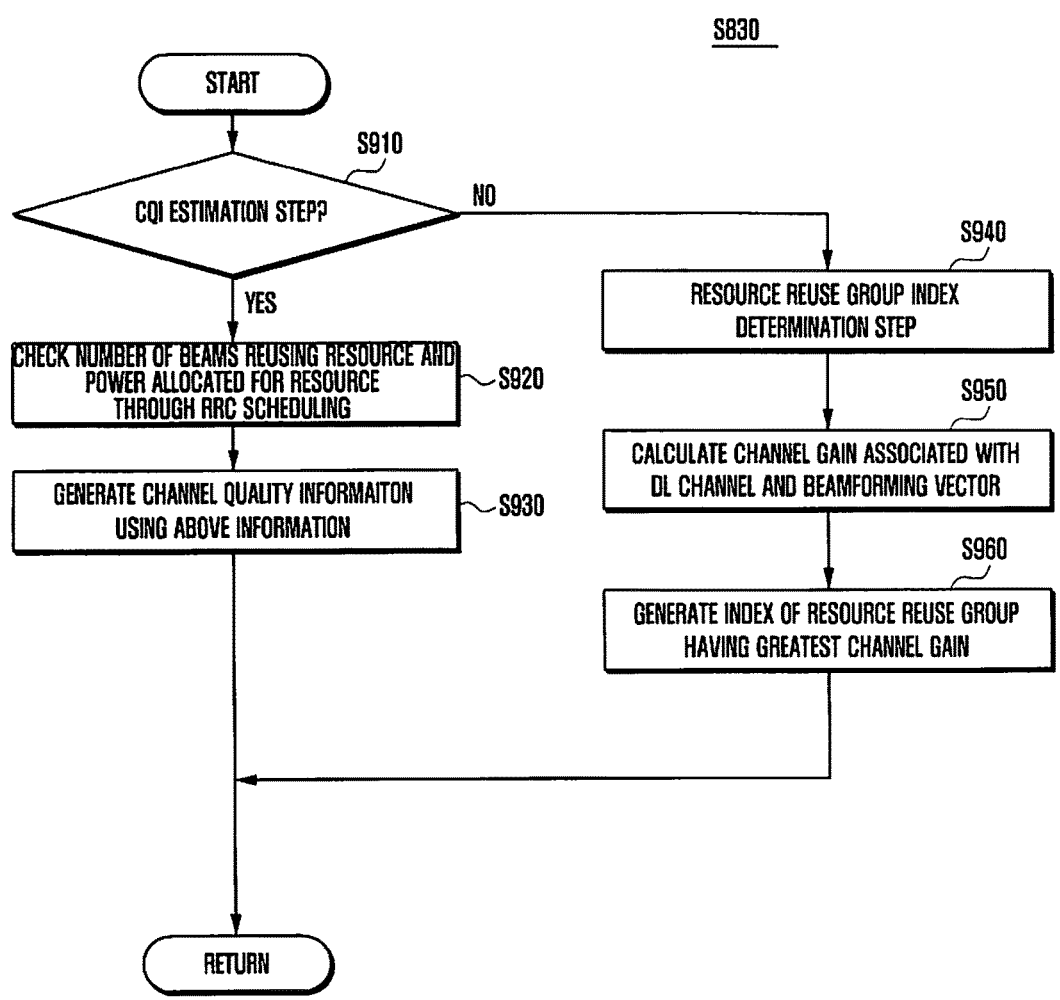
FIG. 9 is a flowchart illustrating feedback information generation of step S830 in FIG. 8, according to an embodiment of the present invention.

FIG. 9 is a flowchart illustrating the feedback information generation step S830 of FIG. 8, according to an embodiment of the present invention.

The feedback information includes the CQI and resource reuse group index. Accordingly, the receiver determines whether it is necessary to measure CQI, in step S910.

If it is necessary to measure CQI, the receiver checks the number of resource beams and power allocated for the resource through downlink RRC signaling, in step S920. The receiver generates the CQI using the acquired information, in step S930. The receiver transmits the channel quality information to the transmitter.

If it is not necessary to measure CQI at step S910, the receiver determines that it is necessary to determine the resource reuse group index, in step S940.

The receiver calculates the channel gain with the downlink channel and beamforming vector, in step S950. The receiver generates the group index indicating the resource reuse group having the greatest channel gain, and transmits the resource reuse group index to the transmitter, in step S960.

Figure 10:
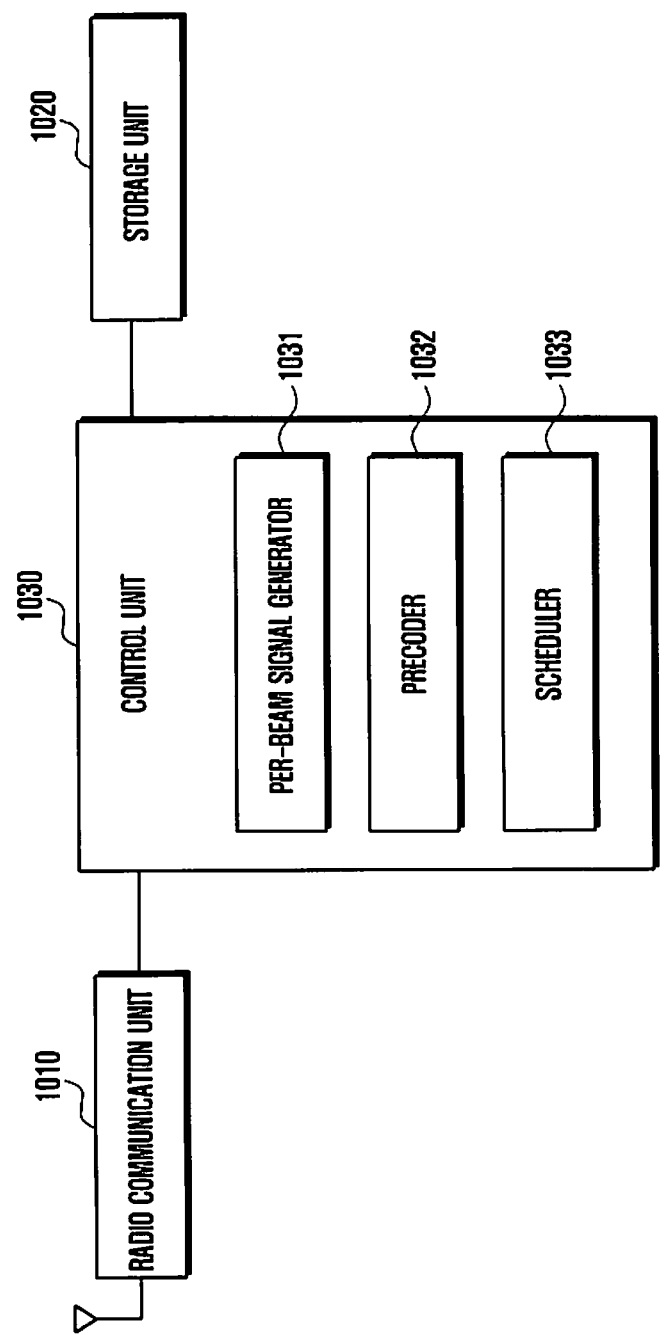
FIG. 10 is a block diagram illustrating a configuration of the transmitter, according to an embodiment of the present invention.

FIG. 10 is a block diagram illustrating a configuration of the transmitter, according to an embodiment of the present invention. As shown in FIG. 10, the transmitter, according to an embodiment of the present invention, includes a radio communication unit 1010, a storage unit 1020, and a control unit 1030.

The radio communication unit 1010 is responsible for communicating signals with the receiver. According to an embodiment of the present invention, the radio communication unit 1010 is provided with a plurality antenna ports, and supports communications with the massive MIMO system operating in the FDD mode.

The storage unit 1020 is capable of storing program and data associated with the operations of the transmitter.

The control unit 1030 determines the beam having the greatest gain between the transmitter and the receiver, and controls the resource allocation for the determined beam. According to an embodiment of the present invention, the control unit 1030 is capable of controlling higher layer signaling for transmitting information including at least one of a number of beams reusing each resource element, each CSI-RS resource, and a power allocated to each beam, in order for the receiver to estimate the CQI.

According to an embodiment of the present invention, the control unit 1030 includes a per-beam signal generator 1031, a precoder 1032, and a scheduler 1033.

The per-beam signal generator 1031 generates the per-beam signals to be transmitted through the respective antenna ports. The per-beam signal can be a random sequence generated by the transmitter that is known by both or any of the transmitter and receiver. As described above, the per-beam signal may have a size of 1, according to an embodiment of the present invention.

The precoder 1032 generates beams by precoding the per-beam signals generated by the per-beam signal generator 1031 with the beamforming vector. The beams formed by the precoder 1032 are sorted into a certain number of resource reuse groups to be transmitted to the receiver using the determined resource.

The scheduler 1033 determines the beam having the greatest gain for the transmitter using the feedback information from the receiver, and allocates the resource to the determined beam.

More specifically, the scheduler 1033 extracts the resource reuse group index from the feedback information. Simultaneously, the scheduler 1033 estimates the uplink spatial correlation matrix using the uplink SRS transmitted by the receiver, and calculates the average channel gain for a downlink channel using the estimated uplink spatial correlation matrix. Afterward, the scheduler is capable of determining the beam having the greatest gain for the transmitter using the resource reuse group index and the average channel gain for the downlink channel.

Figure 11:
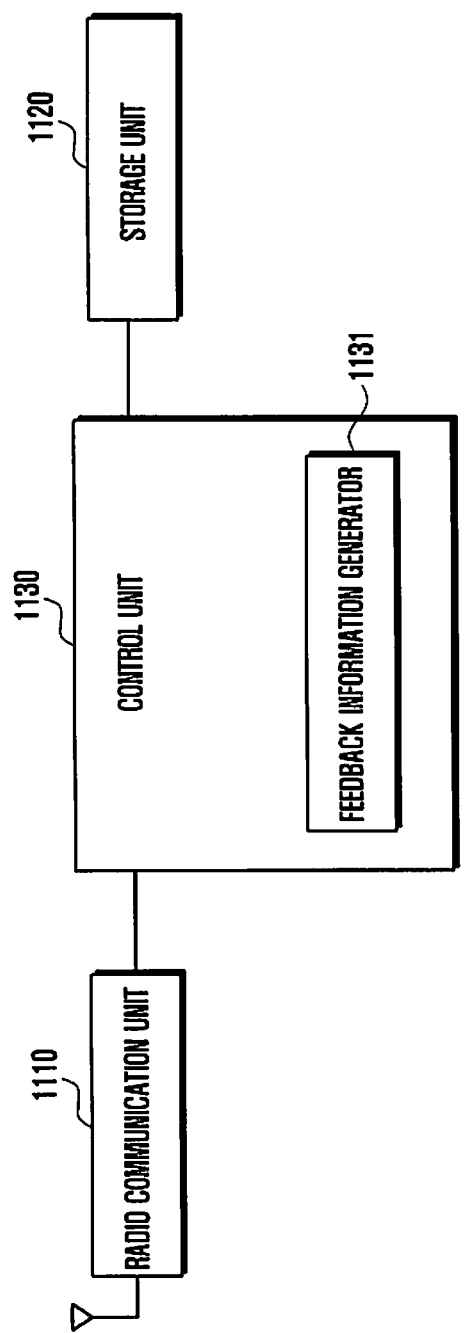
FIG. 11 is a block diagram illustrating a configuration of the receiver, according to an embodiment of the present invention.

FIG. 11 is a block diagram illustrating a configuration of the receiver, according to an embodiment of the present invention. As shown in FIG. 11, the transmitter, according to an embodiment of the present invention, includes a radio communication unit 1110, a storage unit 1120, and a control unit 1130.

The radio communication unit 1110 is responsible for communicating signals with the transmitter. According to an embodiment of the present invention, the radio communication unit 1110 is provided with a plurality of antenna ports, and supports communication with the massive MIMO system operating in the FDD mode.

The storage unit 1120 is capable of storing programs and data associated with the overall operations of the receiver.

The control unit 1130 controls the procedure for generating feedback information for use in determining the beam having the greatest gain at the transmitter, and for transmitting the feedback information to the transmitter. The control unit 1130 includes a feedback information generator 1131.

The feedback information generator 1131 receives the beams sorted into a certain number of resource reuse groups that are transmitted by the transmitter through the resources allocated for the respective groups. The beams are formed by precoding the per-beam signals to be transmitted through individual antenna ports of the transmitter with the beamforming vector.

The feedback information generator 1131 generates the feedback information for use in determining the beam having the greatest gain at the transmitter using the received beams.

Specifically, the feedback information generator 1131 generates the information on the downlink channel and the index of the resource reuse group having the greatest channel gain in association with the beamforming vector, and transmits this information to the transmitter in the form of feedback information.

The feedback information generator 1131 receives the information, including at least one of a number of beams reusing the resource element, each CSI-RS resource, and the power allocated for each beam through higher layer signaling. The feedback information generator 1131 estimates the channel quality information using the received information, and transmits the feedback, including the estimated channel quality information, to the transmitter.

Figure 12:
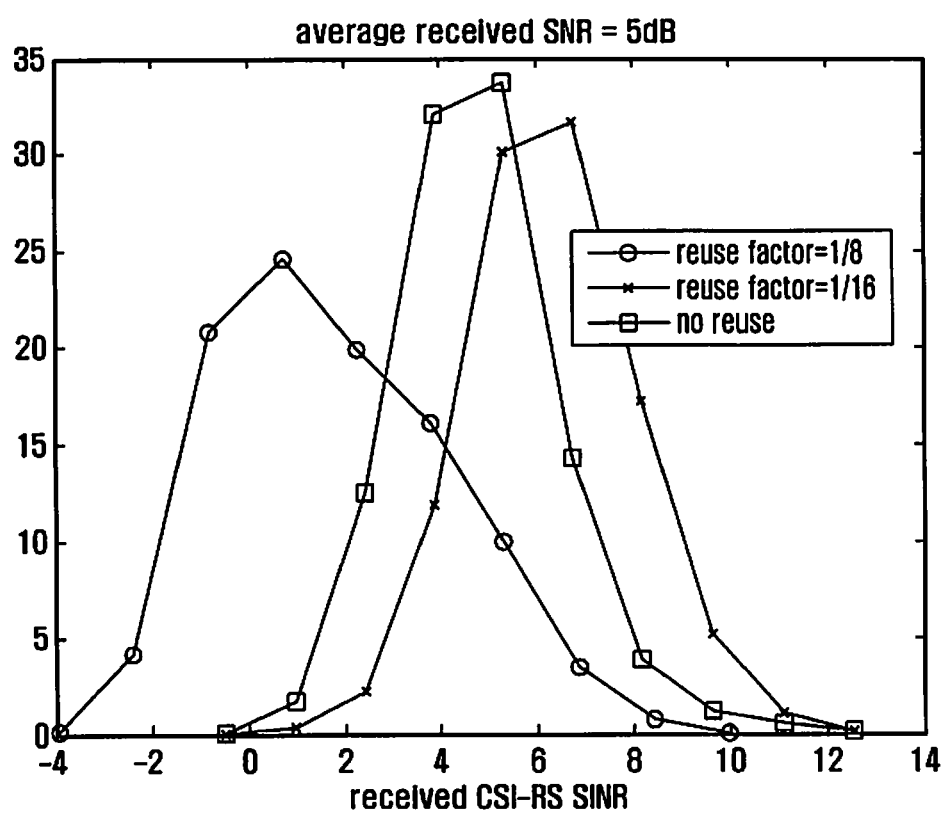
FIG. 12 is a graph illustrating simulation results of CSI-RS reception SINRs when transmitting channel information on 128 transmit antennas using 8 and 16 CSI-RS resources, and when transmitting the channel information on 128 transmit antennas without resource reuse in the system, according to an embodiment of the present invention.

FIG. 12 is a graph illustrating simulation results of CSI-RS reception SINRs when transmitting channel information on 128 transmit antennas using 8 and 16 CSI-RS resources, and when transmitting the channel information on 128 transmit antennas without resource reuse in the system, according to an embodiment of the present invention. When using 16 resources, i.e., reusing the resource for 8 transmit antenna information, a small amount of degradation is shown in CSI-RS reception performance as compared to the case without resource reuse. This shows that the method of the present invention is capable of reducing a resource amount necessary for transmitting 128 CSI-RSs to 1/8 while minimizing the CSI-RS reception performance degradation.

As described above, the CSI-RS transmission method and apparatus of embodiments of the present invention are advantageous in that the massive MIMO transmitter using a plurality of transmit antennas is capable of efficiently transmitting the channel information on the plurality of transmit antennas using the limited amount of downlink resources, and the receiver is capable of efficiently estimating the downlink channel state information.

The CSI-RS transmission method and apparatus of embodiments of the present invention are also advantageous in that the reception performance for a specific beam is dramatically improved, even with a low transmit power per transmit antenna, such that the mobile station is capable of efficiently estimating the channel information transmitted through the plurality of transmit antennas.

The CSI-RS transmission method and apparatus of embodiment of the present invention are also advantageous in that the resource amount required for transmitting the channel information on a plurality of transmit antennas is dramatically reduced without performance degradation by allocating the same resource for the beams that can suppress the intra-channel interference with the high spatial interference suppression performance of the massive MIMO system.

The CSI-RS transmission method and apparatus of embodiments of the present invention are also advantageous in that it is possible to determine the beam having the greatest gain at the base station transmitter by combining the resource reuse group index information instantaneously fed back by the mobile station receiver and the average channel gain information for the beams estimated by the transmitter from the uplink spatial correlation matrix.

Furthermore, the CSI-RS transmission method and apparatus of embodiments of the present invention are advantageous in that the base station notifies the mobile stations of information on a number of beams reusing each CSI-RS resource and power allocated for each CSI-RS resource, such that each mobile station receiver is capable of precisely estimating CQI.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A beamforming method of a transmitter using a plurality of antenna ports in a wireless communication system, the beamforming method comprising:

generating signals for beams to be transmitted through corresponding antenna ports;

forming the beams by precoding the signals with beamforming vectors;

sorting the beams into a plurality of resource reuse groups which share a channel state information reference signal (CSI-RS) resource;

transmitting, to a receiver, CSI-RSs using the beams on CSI-RSs resources determined based on the resource reuse groups, a plurality of beams included in one of the resource reuse groups being transmitted in one of the CSI-RSs resources;

selecting a beam based on feedback information on the CSI-RSs transmitted by the receiver; and allocating a transmission resource for the selected beam, wherein selecting the beam comprises:

receiving an index of one of the resource reuse groups having a greatest gain in association with a downlink channel and a beamforming vector, from the receiver;

estimating an uplink spatial correlation matrix using an uplink Sounding Reference Signal (SRS) transmitted by the receiver;

calculating an average channel gain on downlink channels using the estimated uplink spatial correlation matrix; and determining the beam having the greatest gain for the transmitter from among the plurality of beams included in the one of the resource reuse groups having the index and the average channel gain on the downlink channels.

2. The beamforming method of claim 1, wherein sorting the beams comprises grouping beams having a minimum interference with each other into a resource reuse group.

3. The beamforming method of claim 1, further comprising transmitting information including at least one of a number of beams reusing each resource element, each CSI-RS resource, and a power allocated for each beam to estimate channel quality information at the receiver, through higher layer signaling.

4. An information feedback method by a receiver in a wireless communication system, the information feedback method comprising:

receiving, from a transmitter, beams sorted into a plurality of resource reuse groups through channel state information reference signal (CSI-RS)s resources determined based on respective resource reuse groups, a plurality of beams included in one of the resource reuse groups being transmitted in one of the CSI-RSs resources;

generating feedback information on CSI-RSs, based on the received beams, to determine a beam at the transmitter; and transmitting the feedback information to the transmitter, wherein the beams transmitted from the transmitter are formed by precoding per-beam signals to be transmitted through respective antenna ports of the transmitter with respective beamforming vectors, wherein transmitting the feedback information comprises:

transmitting an index of one of the resource reuse groups having a greatest channel gain in association with a downlink channel and a beamforming vector, to the transmitter, and wherein an uplink spatial correlation matrix is estimated using an uplink Sounding Reference Signal (SRS) transmitted by the receiver, wherein an average channel gain on downlink channels is calculated using the estimated uplink spatial correlation matrix; and wherein the beam having the greatest gain for the transmitter is determined from among the plurality of beams included in the one of the resource reuse groups having the index and the average channel gain on the downlink channels.

5. The information feedback method of claim 4, wherein generating the feedback information comprises:

determining an index of one of the resource reuse groups having a greatest channel gain in association with a downlink channel and a beamforming vector; and transmitting the index to the transmitter.

6. The information feedback method of claim 4, further comprising receiving information including at least one of a number of beams reusing each resource element, each CSI-RS resource, and a power allocated for each beam for use in channel quality information estimation at a receiver, through higher layer signaling.

7. The information feedback method of claim 6, further comprising:

estimating channel quality information using the information received through higher layer signaling; and transmitting the channel quality information to the transmitter.

8. The information feedback method of claim 7, wherein the channel quality information comprises at least one of a reception available signal-to-interference and noise ratio, a data rate available from the transmitter to the receiver, and a modulation and coding scheme available for transmission from the transmitter to the receiver.

9. A transmitter equipped with a plurality of antenna ports for beamforming in a wireless communication system, the transmitter comprising:

a radio communication unit configured to communicate signals with a receiver; and a control unit configured to control to generate signals for beams to be transmitted through corresponding antenna ports, to form the beams by precoding the signals with beamforming vectors, to sort the beams into a plurality of resource reuse groups which share a channel state information reference signal (CSI-RS) resource, to transmit, to a receiver, CSI-RSs using the beams on CSI-RS resources determined based on the respective resource reuse groups, and select a beam based on feedback information on the CSI-RSs transmitted by the receiver, and to allocate a transmission resource for the selected beam, wherein a plurality of beams included in one of the resource reuse groups are transmitted in one of the CSI-RSs resources, and wherein the control unit is further configured to control to receive an index of one of the resource reuse groups having a greatest gain in association with a downlink channel and a beamforming vector, from the receiver, to estimate an uplink spatial correlation matrix using an uplink Sounding Reference Signal (SRS) transmitted by the receiver, to calculate an average channel gain on downlink channels using the estimated uplink spatial correlation matrix, and to determine the beam having the greatest gain for the transmitter from among the plurality of beams included in the one of the resource reuse groups having the index and the average channel gain on the downlink channels.

10. The transmitter of claim 9, wherein the control unit is further configured to control grouping of the beams having a minimum interference with each other into a resource reuse group.

11. The transmitter of claim 9, wherein the control unit is further configured to control transmission of information including at least one of a number of beams reusing each resource element, each CSI-RS resource, and a power allocated for each beam to estimate channel quality information at the receiver, through higher layer signaling.

12. A receiver for transmitting feedback information to a transmitter in a wireless communication system, the receiver comprising:
 a radio communication unit configured to communicate signals with the transmitter; and
 a control unit configured to control to receive, from a transmitter, beams sorted into a plurality of resource reuse groups through channel state information reference signal (CSI-RS)s resources determined based on the respective resource reuse groups, to generate feedback information on the CSI-RSs, based on the received beams, to determine a beam at the transmitter and to transmit the feedback information to the transmitter,
 wherein the beams transmitted from the transmitter are formed by precoding per-beam signals to be transmitted through respective antenna ports of the transmitter with respective beamforming vectors,
 wherein a plurality of beams included in one of the resource reuse groups are transmitted in one of the CSI-RSs resources,
 wherein the control unit is further configured to transmit an index of one of the resource reuse groups having a greatest gain in association with a downlink channel and a beamforming vector, to the transmitter, and
 wherein an uplink spatial correlation matrix is estimated using an uplink Sounding Reference Signal (SRS) transmitted by the receiver,
 wherein an average channel gain on downlink channels is calculated using the estimated uplink spatial correlation matrix; and
 wherein the beam having the greatest gain for the transmitter is determined from among the plurality of beams included in the one of the resource reuse groups having the index and the average channel gain on the downlink channels.

13. The receiver of claim 12, wherein the control unit is further configured to control to determine an index of one of the resource reuse groups having a greatest channel gain in association with a downlink channel and a beamforming vector, and to transmit the index to the transmitter.

14. The receiver of claim 12, wherein the control unit is further configured to control to receive information including at least one of a number of beams reusing each resource element, each CSI-RS resource, and a power allocated for each beam for use in channel quality information estimation at the receiver, through higher layer signaling.

15. The receiver of claim 14, wherein the control unit is further configured to control to estimate channel quality information using the information received through higher layer signaling, and to transmit the channel quality information to the transmitter.

16. The receiver of claim 14, wherein the channel quality information comprises at least one of a reception available signal-to-interference and noise ratio, a data rate available from the transmitter to the receiver, and modulation and a coding scheme available for transmission from the transmitter to the receiver.

* * * * *